United States Patent
Gorti et al.

(10) Patent No.: US 11,151,054 B2
(45) Date of Patent: Oct. 19, 2021

(54) SPECULATIVE ADDRESS TRANSLATION REQUESTS PERTAINING TO INSTRUCTION CACHE MISSES

(71) Applicant: International Business Machines Corporation, Armonk, NY (US)

(72) Inventors: Naga P. Gorti, Austin, TX (US); Mohit Karve, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 32 days.

(21) Appl. No.: 16/455,116

(22) Filed: Jun. 27, 2019

(65) Prior Publication Data

US 2020/0409864 A1    Dec. 31, 2020

(51) Int. Cl.
| | |
|---|---|
| *G06F 12/1027* | (2016.01) |
| *G06F 12/0811* | (2016.01) |
| *G06F 9/38* | (2018.01) |
| *G06F 9/30* | (2018.01) |

(52) U.S. Cl.
CPC ...... *G06F 12/1027* (2013.01); *G06F 9/30123* (2013.01); *G06F 9/3842* (2013.01); *G06F 12/0811* (2013.01); *G06F 2212/1021* (2013.01); *G06F 2212/684* (2013.01)

(58) Field of Classification Search
CPC ............ G06F 12/1027; G06F 9/30123; G06F 9/3842; G06F 12/0811; G06F 2212/1021; G06F 2212/684; G06F 8/4442
See application file for complete search history.

(56) References Cited

U.S. PATENT DOCUMENTS

| | | |
|---|---|---|
| 7,831,799 B1 | 11/2010 | Belgard |
| 7,890,734 B2 | 2/2011 | Golla |
| 8,301,865 B2 | 10/2012 | Grohoski et al. |
| 8,621,443 B2 | 12/2013 | Miura |
| 9,009,445 B2 | 4/2015 | Pan |
| 9,189,417 B2 | 11/2015 | Kaplan et al. |
| 9,588,880 B2 | 3/2017 | Ping et al. |

(Continued)

OTHER PUBLICATIONS

Shin et al. "Scheduling Page Table Walks for Irregular GPU Applications", Proceedings of the 45th Annual International Symposium on Computer Architecture, Los Angeles, CA, Jun. 2-6, 2018, pp. 180-192.

(Continued)

*Primary Examiner* — Eric Cardwell
(74) *Attorney, Agent, or Firm* — Patterson + Sheridan, LLP

(57) ABSTRACT

A central processing unit (CPU) sets a cache lookup operation to a first mode in which the CPU searches a cache and only performs an address translation in response to a cache miss. The CPU performs the cache lookup operation while in the first mode using an address that results in a cache miss. Responsive to the CPU detecting the cache miss, the CPU sets the cache lookup operation from the first mode to a second mode in which the CPU concurrently searches the cache and performs an address translation. The CPU performs a cache lookup operation while in the second mode using a second address that results in a cache hit. Responsive to detecting the cache hit, the CPU sets the cache lookup operation from the second mode to the first mode. This process repeats in cycles upon detection of cache hits and misses.

17 Claims, 5 Drawing Sheets

(56) References Cited

U.S. PATENT DOCUMENTS

| | | | |
|---|---|---|---|
| 10,037,280 B2 | 7/2018 | Podaima et al. | |
| 10,102,143 B2 | 10/2018 | Williamson et al. | |
| 2002/0087794 A1* | 7/2002 | Jouppi | G06F 9/3834 |
| | | | 711/126 |
| 2008/0147977 A1* | 6/2008 | Toussi | G06F 12/0862 |
| | | | 711/122 |
| 2009/0217013 A1 | 8/2009 | Caprioli | |
| 2014/0173244 A1 | 6/2014 | Thompson | |
| 2016/0179679 A1* | 6/2016 | Morris | G06F 12/0884 |
| | | | 711/137 |
| 2017/0344492 A1 | 11/2017 | Bolbenes et al. | |
| 2018/0018297 A1 | 1/2018 | Craddock et al. | |
| 2018/0293126 A1 | 10/2018 | Hicks et al. | |
| 2020/0218660 A1* | 7/2020 | Merritt | G06F 12/0831 |

OTHER PUBLICATIONS

Yoon et al. "Filtering Translation Bandwidth With Virtual Caching", Proceedings of the Twenty-Third International Conference on Architectural Support for Programming Languages and Operating Systems, Williamsburg, VA, Mar. 24-28, 2018, pp. 113-127.

Barr et al. "SpecTLB: A Mechanism for Speculative Address Translation", Proceedings of the 38th annual international symposium on Computer architecture, San Jose, CA, Jun. 4-8, 2011, pp. 307-318.

Yoon et al. "Reducing GPU Address Translation Overhead With Virtual Caching", Computer Sciences Technical Report#1842, University of Wisconsin, 2016, pp. 1-13.

* cited by examiner

SPECULATIVE ADDRESS TRANSLATION REQUESTS PERTAINING TO INSTRUCTION CACHE MISSES

BACKGROUND

The present invention relates to caching in a computer, and more specifically, to a cache management technique that permits a central processing unit (CPU) to predict future instruction cache misses so that a cache access and translation request can proceed in parallel.

A persistent driving force in the design of CPUs has been to increase the speed of execution of program instructions. Increasing raw processor clock frequency has been one approach, but further increases beyond 4 gigahertz have stalled in recent years. Recent emphasis has been placed on redesigning aspects of the CPU architecture to optimize various features. Design changes have included, for example, caching, pipelining, multi-hardware threading, providing and coordinating multiple processor cores on one CPU, branch prediction, and out-of-order execution of instructions.

A CPU cache is a hardware cache used by the CPU to reduce the average cost (time or energy) to access data and instructions from main memory. A cache is a smaller, faster memory, closer to a processor core, which stores copies of the data from frequently used main memory locations (that have physical addresses). Most CPUs have different independent caches, including instruction caches and data caches usually organized as a hierarchy of cache levels (L1, L2, L3, L4, etc.).

Other types of caches exist, such as a translation lookaside buffer (TLB) that is part of the memory management unit (MMU) that many CPUs have. The job of the memory management unit, as the name implies, is to manage the various types of memory associated with the CPU. Examples of tasks with memory that the MMU performs include translating logical program addresses into physical RAM addresses, and providing memory protection and paging abilities for virtual memory.

In a typical sequence of execution of a program by a CPU, the CPU obtains an instruction pointed to by a program counter (PC) that includes an address in memory where the instruction is located. The instruction may additionally load and store elements from memory. The address is usually a virtual address in the memory space of the executing program, which has an associated physical address in the main memory. The CPU typically searches for the virtual address in a lowest level cache (L1). The L1 cache may already contain the mapping of the virtual address to its corresponding physical address. If the virtual address in the L1 cache is not found, then a cache miss occurs. The CPU then performs an address translation of the input virtual address to the corresponding physical address of the instruction. That physical address is then searched for in L2 cache, then higher level caches, and, if not found in the cache hierarchy, in main memory.

Unfortunately, address translation typically involved accessing a content addressed memory (CAM), which is power intensive. To save power, an address translation may be performed only upon detecting the cache miss. However, this incurs a performance penalty since the CPU needs to wait to ascertain a miss in order to fire off a translation request.

SUMMARY

According to one embodiment of the present disclosure, a central processing unit (CPU) sets a cache lookup operation for a cache of the CPU to a first mode. The cache lookup operation in the first mode searches the cache and only performs an address translation in response to a cache miss. The CPU obtains a first address while in the first mode during execution of code by the CPU. The CPU performs the cache lookup operation using the first address that results in a cache miss. Responsive to the CPU detecting the cache miss, the CPU sets the cache lookup operation for the cache from the first mode to a second mode. The cache lookup operation in the second mode concurrently searches the cache and performs an address translation.

The CPU then obtains a second address during execution of the code by the CPU. The CPU performs the cache lookup operation while in the second mode using the second address that results in a cache hit. Responsive to detecting the cache hit, the CPU sets the cache lookup operation for the cache from the second mode to the first mode.

DETAILED DESCRIPTION

Embodiments of the present disclosure employ a cache management technique that permits the CPU to predict future instruction cache misses so that a cache access and translation request can proceed in parallel. This reduces the latency of a cache miss without the power penalty of translating all instruction cache accesses.

Embodiments of a speculative address method trigger, in a first mode of operation, a speculative translation request for instruction accesses when the CPU expects the current instruction access to incur a miss. This expectation is based on the observation that many computational processes spend large amounts of execution time in select kernels/loops that are executed repeatedly. The speculative mode op operation reduces cache latency during warm up time for kernels/loops in the instruction cache.

Initially, when a fetch unit of the CPU performs a cache lookup of a virtual address to find the instruction needed for execution the CPU may find the instruction in the L1 cache and proceed with execution of the instruction. When a cache miss is first incurred, control flow of the executing program is expected to move to a new computation kernel where the instruction cache needs to be "warmed-up" with a few lines of code that constitute one or some loops that form the crux of the kernel. As such, it is very reasonable to expect further instruction cache misses until the "warm-up" ends, which is indicated by a hit in the instruction cache. Hence, subsequent cache lookups proceed in parallel with translation requests starting with an instruction cache miss and continue until a cache hit is encountered. At this point, the speculative translation requests stop. Execution of the speculative address translation method leads to a small increase in the number of translation accesses, which are not needed since they actually result in a hit, while speculative translation requests provides performance benefits to many real translation requests since speculative translation requests track further instruction cache misses faithfully.

Figure 1:
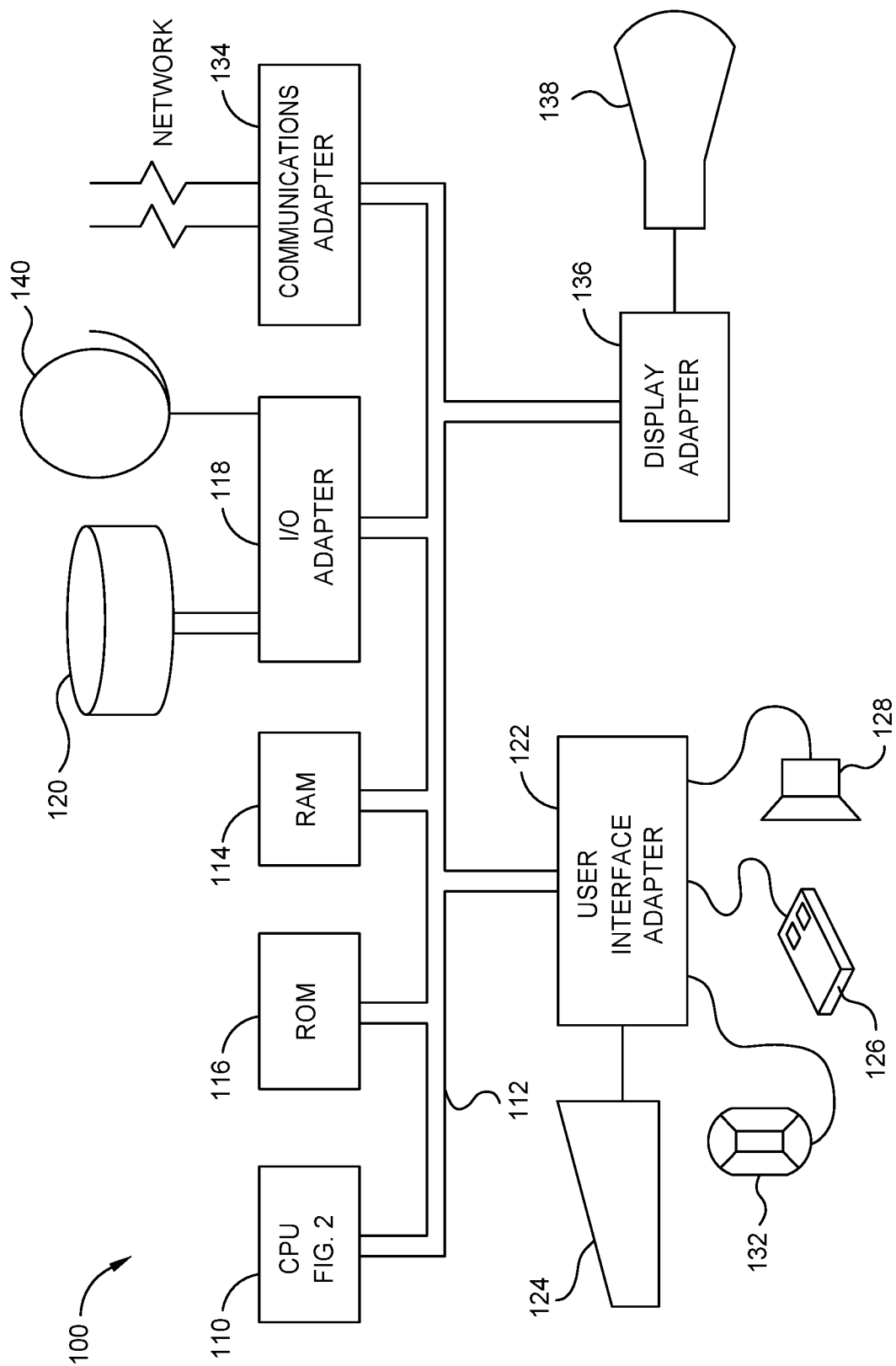
FIG. 1 illustrates an example of a data processing system 100 in which aspects of the present disclosure may be practiced.

FIG. 1 illustrates an example of a data processing system 100 in which aspects of the present disclosure may be practiced. The system has a central processing unit (CPU) 110 such as a PowerPC microprocessor ("PowerPC" is a trademark of IBM Corporation). The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system through the keyboard 124, trackball 132 or mouse 126 and receiving output from the system via speaker 128 and display 138. Additionally, an operating system such as AIX ("AIX" is a trademark of the IBM Corporation) is used to coordinate the functions of the various components shown in FIG. 1.

The CPU (or "processor") 110 includes various registers, buffers, memories, and other units formed by integrated circuitry, and operates according to reduced instruction set computing ("RISC") techniques. The CPU 110 processes according to processor cycles, synchronized, in some aspects, to an internal clock (not shown).

Figure 2:
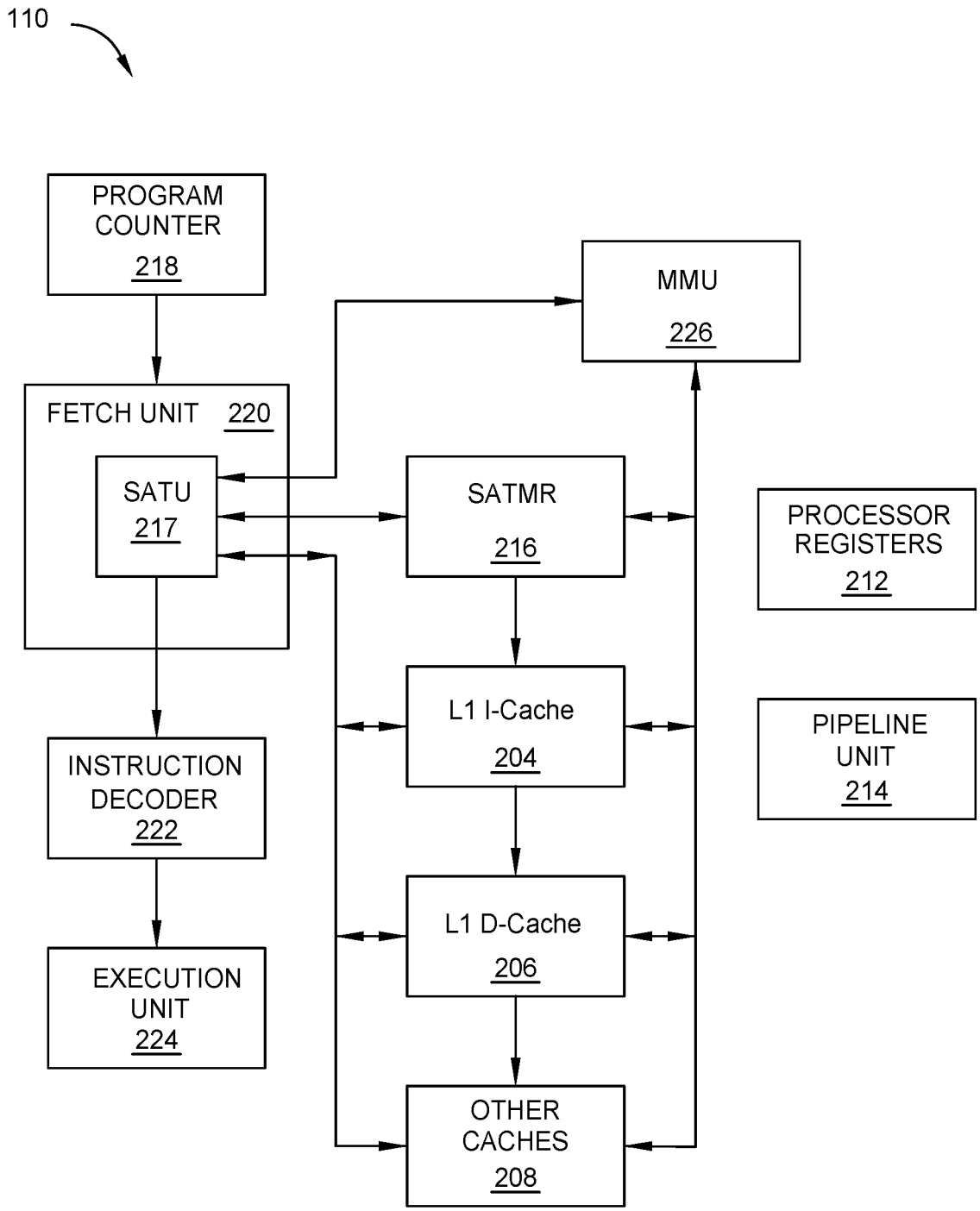
FIG. 2 illustrates a block diagram of a CPU in which certain aspects of the present disclosure may be practiced.

FIG. 2 illustrates a block diagram of the CPU 110 in which certain aspects of the present disclosure may be practiced. The CPU 110 includes a memory, such as random access memory 114, L1 instruction cache (L1 I-Cache) 204 and L1 data cache (L1 D-Cache) 206, other caches 208 (including a translation lookaside buffer (TLB), an L2 cache, and higher level caches in a cache hierarchy), processor registers 212, and a pipeline unit 214 if the CPU 110 is a pipelined processor. The CPU 110 further includes a program counter (PC) 218, a fetch unit 220 that comprises a speculative address translation unit (SATU) 217, an instruction decoder 222, and an execution unit 224 for executing an instruction execution cycle in the CPU 110, all of whose operations are coordinated by a memory management unit (MMU) MMU.

The SATU 217 sets and clears a bit flag in a speculative address translation mode register (SATMR) 216 for each thread of execution of the CPU 110 when the CPU is a multi-threaded CPU. Each bit flag is indicative of a cache lookup miss or hit, respectively, that occurs when the SATU 217 executes a speculative address translation requests to be described hereinbelow in connection with FIGS. 3A, 3B, 4 and 5.

The fundamental operation of most CPUs, regardless of the physical form they take, is to execute a sequence of stored instructions forming a program. The instructions to be executed are kept in computer memory (e.g., random access memory 114). Nearly all CPUs follow fetch, decode, and execute steps in their operation, which are collectively known as the instruction cycle. After the execution of an instruction, the entire process repeats, with the next instruction cycle normally fetching the next-in-sequence instruction because of the incremented value in the PC 218. If a jump instruction was executed, the PC 218 is modified to contain the address of the instruction that was jumped to and program execution continues normally.

The first step, fetch, involves the fetch unit 220 of the CPU 110 retrieving an instruction (which is represented by a number or sequence of numbers) from program memory (e.g., random access memory 114). The instruction's location (address) in program memory is determined by the PC 218, which stores a number that identifies the address of the next instruction to be fetched. After an instruction is fetched, the PC 218 is incremented by the length of the instruction so that it contains the address of the next instruction in the sequence. Often, the instruction to be fetched is retrieved from relatively slow memory (e.g., random access memory 114). Alternatively, the CPU 110 may first search the caches 204, 206, 208 for the instruction, its associated virtual address, and a physical address. The fetch unit 220 transmits the virtual address of the instruction to the SATU 217 to perform the speculative address translation method of the present disclosure, to be described in connection with FIGS. 3A, 3B, 4, and 5.

The instruction that the CPU 110 fetches from memory determines what the CPU 110 will do. In the decode step, performed by the circuitry known as the instruction decoder 222, the instruction is converted into signals that control other parts of the CPU 110.

The way in which the instruction is interpreted is defined by the CPU 110's instruction set architecture (ISA). Often, one group of bits (that is, a "field") within the instruction, called the opcode, indicates which operation is to be performed, while the remaining fields usually provide supplemental information required for the operation, such as the operands. Those operands may be specified as a constant value (called an immediate value), or as the location of a value that may be one of the processor registers 212 or a memory address, as determined by some addressing mode.

After the fetch and decode steps, the execute step is performed by execution unit 224. Depending on the CPU architecture, this may include a single action or a sequence of actions. During each action, various parts of the CPU 110 are electrically connected so they can perform all or part of the desired operation and then the action is completed, typically in response to a clock pulse. Very often the results are written to a processor register 212 for quick access by subsequent instructions. In other cases, results may be written to the caches 204, 206, 208. In still other cases, results may be written to slower, but less expensive and higher capacity main memory (e.g., random access memory 114).

Figure 3B:
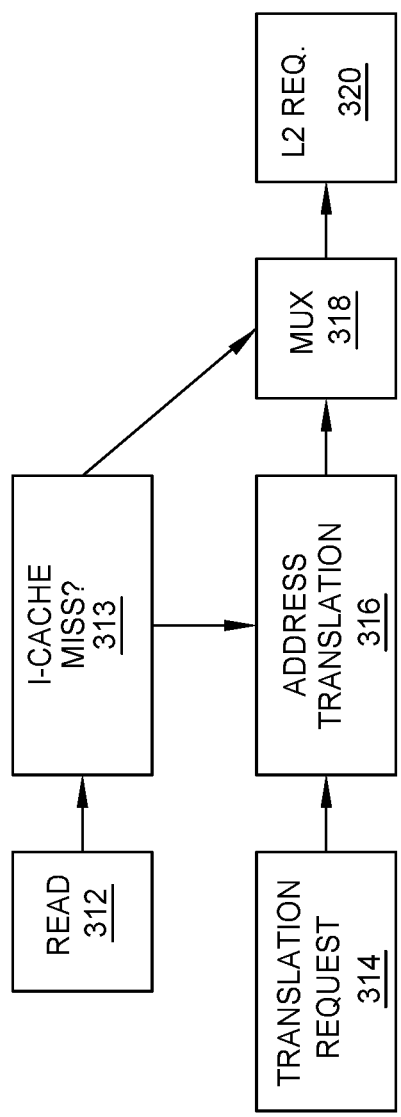
FIG. 3B is a block diagram illustrating a speculative second mode of operation of an address translation after the CPU encounters a cache miss and continues to operate in this mode until the CPU encounters a subsequent cache hit.
Figure 3A:
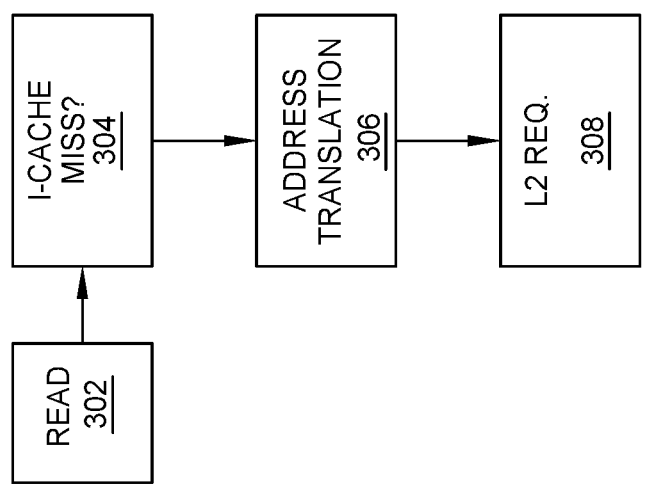
FIG. 3A is a block diagram illustrating a non-speculative first mode of operation of an address translation request after the CPU encounters a cache hit and continues to operate in a non-speculative mode of operation until the CPU encounters a subsequent cache miss.

FIG. 3A is a block diagram illustrating a non-speculative first mode of operation of an address translation request after the CPU 110 encounters a cache hit and continues to operate in a non-speculative mode of operation until the CPU 110 encounters a subsequent cache miss. FIG. 3B is a block diagram illustrating a speculative second mode of operation of an address translation after the processor encounters a cache miss and continues to operate in the speculative second mode of operation until the processor encounters a subsequent cache hit. Referring to FIGS. 2, 3A, and 3B, initially, the SATU 217 sets a cache lookup operation for the L1 I-Cache 204 of the CPU 110 to a first mode. The cache lookup operation in the first mode includes searching the L1 I-Cache 204 (read 302) and only performs an address translation operation (306) in response to a cache miss (304). The SATU 217 clears a bit in the SATMR 216 for a current thread of execution of the CPU 110 indicative of the CPU 110 having not yet encountered a cache lookup miss.

When the fetch unit 220 transmits the virtual address of a first instruction to the SATU 217, the SATU 217 consults the bit for the current thread in SATMR 216 to determine whether the bit is set indicating that the SATU 217 is to perform cache lookup operations in the second mode or whether the bit is cleared indicating that the SATU 217 is to perform cache lookup operations in the first mode. If the bit is not set, the cache lookup operations are to be executed in the first mode. In the first mode, the SATU 217 performs the cache lookup operation (read operation 302) in the L1 I-Cache 204 while in the first mode using the virtual address. If the virtual address is found in the L1 I-Cache 204, no cache miss has been encountered and the first instruction is retrieved from the L1 I-Cache 204 for further decoding and execution. Fetching instructions and performing cache lookups continue in this first mode until a cache miss (304) is encountered.

If a cache miss (304) is encountered while searching the L1 I-Cache 204, then the SATU 217 performs an address translation operation (306) and then searches the L2 cache 208 (L2 request 308) for the first instruction, and may proceed further up the cache hierarchy until the information is retrieved from main memory. The SATU 217 then sets the cache lookup operation for the L1 I-Cache 204 from the first mode to a second mode. In the second mode, for subsequent requests, the SATU 217 executes the cache lookup operation (read 312) by concurrently searching the L1 I-Cache 204 and performing an address translation 316 in response to a translation request 314.

When the fetch unit 220 transmits a virtual address of a second instruction to the SATU 217, the SATU 217 consults the bit in the SATMR 216 to determine whether the bit is not set indicating the first mode of operation or whether the bit is second indicating a second mode of operation. If the bit is set, the cache lookup operations are to be executed in the second mode. The SATU 217 then performs the cache lookup operation (a read operation 310) in the L1 I-Cache 204 in response to a cache miss 313 while in the second mode using the virtual address concurrently with performing an address translation 316 up the cache and memory hierarchy (via the mux 318). The real address is then retrieved from the MMU 226, and subsequently the corresponding second instruction is retrieved from the L2 or higher cache (L2 request 320) or for the main memory retrieved from the L2 or higher cache (L2 request 320) or for the main memory. Fetching instructions and performing cache lookups concurrently with address translations continue in the second mode until a cache hit is encountered. Then the SATU 217 sets the cache lookup operation for the L1 I-Cache 204 from the second mode back to the first mode. The SATU 217 then clears the bit in the SATMR 216 for the current thread of execution of the CPU 110 indicative of the CPU 110 is to operate in the first mode for subsequent requests and having not yet encountered a cache lookup miss after having encountered a cache hit.

In another embodiment, the SATU 217 may switch from the first mode to the second mode after encountering the Nth cache miss after a cache hit, where N is greater than 1. In another embodiment, the SATU 217 may switch from the second mode to the first mode after encountering the Nth cache hit after a cache miss, where N is greater than 1.

In one embodiment, SATU 217 may switch modes for a cache lookup operating in the L1 I-Cache 204. In one embodiment, the SATU 217 may switch modes for a cache lookup operating in the L1 D-Cache 206.

In an embodiment, the SATU 217 may switch modes for a cache lookup operating in a higher level cache than the lowest level cache (e.g., L1 I-Cache 204) in the CPU 110.

In one embodiment, the CPU 110 may perform prefetching of a plurality of addresses during execution of code by the CPU 110. Accordingly, the SATU 217 may perform cache lookup operations for the plurality of addresses according to the first mode or the second mode until a cache lookup for one of the plurality of the addresses encounters a cache miss or a cache hit, respectively.

Note that power consumption of the second mode can be reduced by storing only the last translation request that was processed and accessing that the results of the translation request before accessing a cache for the address translation.

Figure 4:
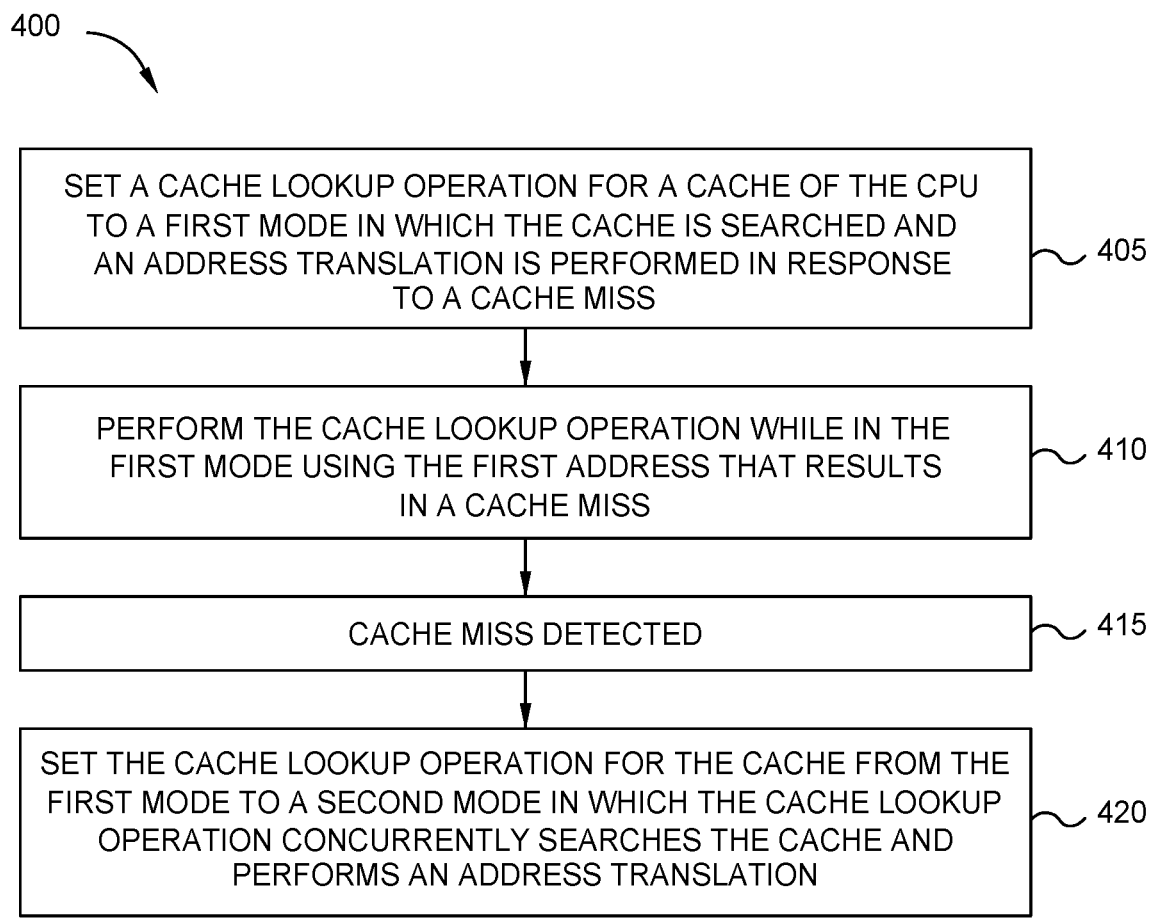
FIG. 4 illustrates one embodiment of a method for triggering a speculative translation request for a subsequent instruction access when a CPU expects a current instruction access to incur a cache miss.

FIG. 4 illustrates one embodiment of a method 400 for triggering a speculative translation request for a subsequent instruction access when a CPU expects a current instruction access to incur a cache miss. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by the SATU 217 of FIG. 2.

At block 405, the SATU 217 sets a cache lookup operation for a cache (e.g., L1 I-Cache 204) of the CPU 110 to a first mode in which the SATU 217 searches the cache (e.g., L1 I-Cache 204) and only performs an address translation while in the first mode in response to a cache miss. At block, 410, the SATU 217 obtains a first address during execution of code by the CPU 110. At block 415, the SATU 217 performs the cache lookup operation while in the first mode using the first address that results in a cache miss. In an embodiment, the cache miss is a result of the cache lookup operation performed on the first instruction. In another embodiment, the cache miss is the Nth cache miss where N is greater than one detected in response to cache lookup operations performed on prior instructions after a cache hit.

At block 420, the SATU 217 detects the cache miss. At block 425, the SATU 217 sets the cache lookup operation for the cache 202 from the first mode to a second mode in which the cache lookup operation concurrently searches the cache (e.g., L1 I-Cache 204) and performs an address translation. Responsive to detecting the cache miss, the SATU 217 sets a bit in the SATMR 216 to indicate that the CPU 110 is to operate in the second mode.

Figure 5:
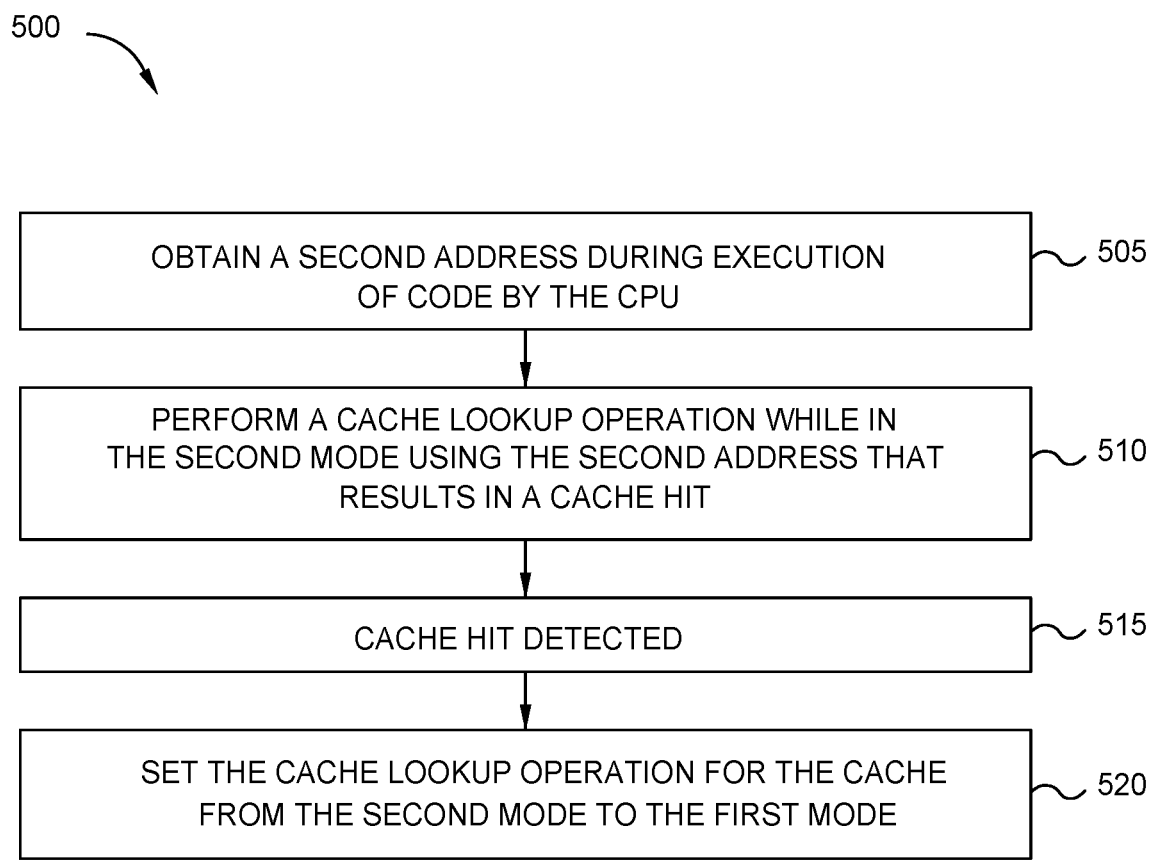
FIG. 5 illustrates one embodiment of a method for triggering a translation request for a subsequent instruction access when a CPU expects a current instruction access to incur a cache hit after executing the method of FIG. 4.

FIG. 5 illustrates one embodiment of a method 500 for triggering a traditional translation request for a subsequent instruction access when a CPU 100 expects a current instruction access to incur a cache hit after executing method 400. Method 500 can be performed by processing logic that can comprise hardware (e.g., circuitry, dedicated logic, programmable logic, microcode, etc.), software (e.g., instructions run on a processing device), or a combination thereof. In one embodiment, method 500 is performed by the SATU 217 of FIG. 2. In one embodiment, the method 500 begins after the method 400 has completed.

At block 505, the SATU 217 obtains a second address during execution of code by the CPU 110 after the CPU switches to the second mode in method 400. At block 510, the SATU 217 performs the cache lookup operation while in the second mode using the second address that results in a cache hit. At block 515, the SATU 217 detects the cache hit. In an embodiment, the cache hit corresponds to a cache lookup of the second instruction. In another embodiment, the cache hit is the Nth cache hit detected where N is greater than one in response to cache lookup operations performed on subsequent instructions after a cache miss.

At block 520, the SATU 217 sets the cache lookup operation for the cache (e.g., L1 I-Cache 204) from the second mode to the first mode. Responsive to detecting the cache hit, the SATU 217 clears the bit previously set in the SATMR 216 to indicate that the CPU 110 is to operate in the first mode.

In an embodiment, prior to performing the cache lookup using the first address or the second address, the SATU 217 determines whether to perform the cache lookup operation in the first mode or the second mode responsive to the bit in the SATMR 216 being cleared or set, respectively. In an embodiment, the SATU 217 sets/clears a bit in the SATMR 216 to indicate that the CPU 110 is to operate in the second mode or the first mode for each thread of execution of the CPU 110 in a multi-threaded CPU 110.

In one embodiment, the cache being acted upon by the SATU 217 is an instruction cache (e.g., L1 I-Cache 204). In one embodiment, the cache being acted upon by the SATU 217 is a data cache (e.g., L1 D-Cache 206). In one embodiment, the cache being acted upon by the SATU 217 is a lowest level cache in the CPU 110 (e.g., L1 I-Cache 204). In one embodiment, the cache being acted upon by the SATU 217 is a higher level cache (e.g., L2 cache 208) than the lowest level cache (e.g., L1 I-Cache 204) in the CPU 110.

In an embodiment, at least one of the first address or the second address is a virtual address and the cache lookup is for a physical address corresponding to the virtual address.

In one embodiment, the CPU 110 may perform pre-fetching of a plurality of addresses during execution of code by the CPU 110. Accordingly, the SATU 217 may perform cache lookup operations for the plurality of addresses according to the first mode or the second mode until a cache lookup for one of the plurality of the addresses encounters a cache miss or a cache hit, respectively.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements discussed above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described above are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for triggering a speculative translation request, comprising:
    setting a cache lookup operation for a first cache of a CPU to a first mode, wherein the cache lookup operation in the first mode searches the first cache and performs an address translation in response to a cache miss;
    obtaining a first address during execution of code by the CPU;
    performing the cache lookup operation while in the first mode using the first address that results in a first cache miss;
    responsive to detecting the first cache miss for the first address, setting the cache lookup operation for the first cache from the first mode to a second mode, wherein the cache lookup operation in the second mode searches the first cache using a second address obtained after the first address is obtained and concurrently translates the second address for a second cache of the CPU separate from the first cache;
    performing the cache lookup operation while in the second mode using the second address that results in a second cache miss;
    in response to detecting the second cache miss, searching the second cache using the translated second address;
    performing the cache lookup operation while in the second mode using a third address obtained after the second address is obtained that results in a cache hit in the first cache; and
    in response to detecting the cache hit, setting the cache lookup operation for the first cache from the second mode to the first mode.

2. The method of claim 1, further comprising, responsive to detecting the first cache miss, setting a bit in a register to indicate that the CPU is to operate in the second mode.

3. The method of claim 2, further comprising, responsive to detecting the cache hit, clearing the bit in the register to indicate that the CPU is to operate in the first mode.

4. The method of claim 2, further comprising, prior to performing the cache lookup operation using the first address or the second address, determining whether to perform the cache lookup operation in the first mode or the second mode responsive to the bit in the register being set or cleared.

5. The method of claim 1, wherein the CPU sets or clears a bit in a register to indicate that the CPU is to operate in the second mode or the first mode for each thread of execution of the CPU.

6. The method of claim 1, wherein the first cache miss is an Nth cache miss after a cache hit, where N is greater than 1.

7. The method of claim 1, wherein the cache hit is an Nth cache hit after a cache miss, where N is greater than 1.

8. The method of claim 1, wherein the first cache is an instruction cache.

9. The method of claim 1, wherein the first cache is a data cache.

10. The method of claim 1, wherein the first cache is a lowest level cache in the CPU.

11. The method of claim 1, further comprising:
pre-fetching a plurality of addresses during execution of code by the CPU; and
performing cache lookup operations for the plurality of addresses according to the first mode or the second mode until a cache lookup for one of the plurality of the addresses encounters a cache miss or a cache hit, respectively.

12. A system for triggering a speculative translation request, comprising:
a central processing unit (CPU) comprising a first cache and a second cache separate from the first cache, wherein the CPU is operable to:
set a cache lookup operation for the first cache to a first mode, wherein the cache lookup operation in the first mode searches the first cache and performs an address translation in response to a cache miss;
obtain a first address during execution of code by the CPU;
perform the cache lookup operation while in the first mode using the first address that results in a cache miss;
responsive to the CPU detecting the cache miss for the first address, set the cache lookup operation for the first cache from the first mode to a second mode, wherein the cache lookup operation in the second mode searches the first cache using a second address obtained after the first address is obtained and concurrently translates the second address for the second cache;
perform the cache lookup operation while in the second mode using the second address that results in a second cache miss;
in response to detecting the second cache miss, search the second cache using the translated second address;
perform the cache lookup operation while in the second mode using a third address obtained after the second address is obtained that results in a cache hit in the first cache; and
in response to detecting the cache hit, set the cache lookup operation for the first cache from the second mode to the first mode.

13. The system of claim 12, wherein the CPU is further operable to, responsive to detecting the first cache miss, set a bit in a register to indicate that the CPU is to operate in the second mode.

14. The system of claim 13, wherein the CPU is further operable to, responsive to detecting the cache hit, clear the bit in the register to indicate that the CPU is to operate in the first mode.

15. A central processing unit (CPU) for triggering a speculative translation request, comprising:
a fetch unit comprising a speculative address translation unit (SATU) for executing the speculative translation request;
a first cache coupled to the SATU;
a second cache separate from the first cache; and
an execution unit for executing instructions of the CPU responsive to the SATU executing the speculative translation request, wherein the SATU is operable to:
set a cache lookup operation for the first cache to a first mode, wherein the cache lookup operation in the first mode searches the first cache and only performs an address translation in response to a cache miss;
obtain a first address during execution of code by the execution unit;
perform the cache lookup operation while in the first mode using the first address that results in a first cache miss;
responsive to detecting the first cache miss, set the cache lookup operation for the first cache from the first mode to a second mode, wherein the cache lookup operation in the second mode searches the first cache using a second address obtained after the first address is obtained and concurrently translates the second address for the second cache;
perform the cache lookup operation while in the second mode using the second address that results in a second cache miss;
in response to detecting the second cache miss, search the second cache using the translated second address
perform the cache lookup operation while in the second mode using a third address obtained after the second address is obtained that results in a cache hit in the first cache; and
in response to detecting the cache hit, setting the cache lookup operation for the first cache from the second mode to the first mode.

16. The CPU of claim 15, wherein the SATU is further operable to, responsive to detecting the first cache miss, set a bit in a register to indicate that the SATU is to operate in the second mode.

17. The CPU of claim 16, wherein SATU is further operable to, responsive to detecting the cache hit, clear the bit in the register to indicate that the SATU is to operate in the first mode.

* * * * *